(12) United States Patent  
Sim et al.

(10) Patent No.: US 9,252,623 B2  
(45) Date of Patent: Feb. 2, 2016

(54) PROTECTION APPARATUS FOR SECONDARY BATTERY

(71) Applicant: Samsung SDI Co., Ltd., Yongin-si, Gyeonggi-do (KR)

(72) Inventors: Se-Sub Sim, Yongin-si (KR); Susumu Segawa, Yongin-si (KR); Masami Omagari, Yongin-si (KR); Yong-Dai Lee, Yongin-si (KR); Jin-Wan Kim, Yongin-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 198 days.

(21) Appl. No.: 13/957,388

(22) Filed: Aug. 1, 2013

(65) Prior Publication Data

US 2014/0084873 A1    Mar. 27, 2014

Related U.S. Application Data

(60) Provisional application No. 61/704,980, filed on Sep. 24, 2012.

(51) Int. Cl.
  *H02J 7/00*   (2006.01)
  *H01M 10/44*  (2006.01)
  *H01M 10/48*  (2006.01)

(52) U.S. Cl.
  CPC .............. *H02J 7/007* (2013.01); *H01M 10/44* (2013.01); *H01M 10/443* (2013.01); *H01M 10/48* (2013.01); *H01M 10/486* (2013.01); *H02J 7/0091* (2013.01); *H01M 2200/00* (2013.01)

(58) Field of Classification Search
  USPC ........................................................ 320/134
  See application file for complete search history.

(56) References Cited

U.S. PATENT DOCUMENTS

| 2008/0233475 | A1* | 9/2008 | Kozu et al. ................. 429/159 |
| 2011/0312391 | A1* | 12/2011 | Benise ....................... 455/572 |
| 2012/0256752 | A1* | 10/2012 | Musser et al. ............. 340/636.2 |
| 2013/0082664 | A1* | 4/2013 | Hiraoka et al. ............... 320/149 |

FOREIGN PATENT DOCUMENTS

| EP | 0 593 770 A1 | 4/1994 |
| KR | 10-2000-0040638 A | 7/2000 |
| KR | 10-2009-0126097 A | 12/2009 |
| KR | 10-20110058378 A | 6/2011 |

OTHER PUBLICATIONS

EPO Search Report dated Feb. 24, 2014, for corresponding European Patent application 13179455.4, (6 pages).

* cited by examiner

*Primary Examiner* — Vuthe Siek
(74) *Attorney, Agent, or Firm* — Christie, Parker & Hale, LLP

(57) ABSTRACT

A battery pack includes a secondary battery; and a protection device including: a measurement unit coupled to the secondary battery and configured to measure a temperature and a voltage of the secondary battery; a temperature estimation unit coupled to the measurement unit and configured to estimate a future temperature of the secondary battery; and a charging/discharging unit coupled to the secondary battery and configured to adjust a current or an input voltage applied to the secondary battery based on the future temperature and the voltage of the secondary battery.

13 Claims, 4 Drawing Sheets

PROTECTION APPARATUS FOR SECONDARY BATTERY

CROSS-REFERENCE TO RELATED APPLICATION

This application claims priority to and the benefit of U.S. Provisional Application No. 61/704,980, filed on Sep. 24, 2012 in the U.S. Patent and Trademark Office, the entire content of which is incorporated herein by reference.

BACKGROUND

1. Field

An aspect of the present invention relates to a protection apparatus for a secondary battery.

2. Description of the Related Art

Recently, secondary batteries have been used as power sources of portable electronic devices in many fields, and accordingly, consumer demand for secondary batteries has rapidly increased. Secondary batteries can be charged and discharged several times and thus are economically and environmentally effective. Accordingly, the use of the secondary batteries is promoted.

A swelling phenomenon in which a secondary battery swells at a high temperature/high voltage due to gas or the like may occur in the secondary battery. The swelling phenomenon may cause an electrical short circuit. If an external impact is applied to the secondary battery in the state in which the secondary battery swells, a spark may occur, causing the secondary battery to explode.

Conventionally, the swelling phenomenon was overcome in such a manner that an extra space was provided in a battery pack having a secondary battery mounted therein so that a user could not perceive the occurrence of a swelling phenomenon of the secondary battery. However, merely increasing the space of the battery pack that holds the secondary battery is contrary to the competing goal of reducing the overall size of consumer electronic products, and also does not help to solve the swelling phenomenon from occurring in the first place.

SUMMARY

Embodiments of the present invention provide a protection apparatus for a secondary battery, in which the charging/discharging of the secondary battery is controlled by estimating a risk that a swelling phenomenon may occur in the secondary battery, so that it is possible to prevent the swelling phenomenon from occurring in the secondary battery.

According to an embodiment of the present invention, there is provided a battery pack including a secondary battery; and a protection device including: a measurement unit coupled to the secondary battery and configured to measure a temperature and a voltage of the secondary battery; a temperature estimation unit coupled to the measurement unit and configured to estimate a future temperature of the secondary battery; and a charging/discharging unit coupled to the secondary battery and configured to adjust a current or an input voltage applied to the secondary battery based on the future temperature and the voltage of the secondary battery.

A memory unit may be coupled to the measurement unit and configured to store swelling condition data of the secondary battery.

The swelling condition data may include a first swelling condition and a second swelling condition. The first swelling condition may include a first range of voltages corresponding to a range of temperatures, and the second swelling condition may include a second range of voltages corresponding to the range of temperatures, wherein for each temperature within the range of temperatures, a corresponding voltage within the second range of voltages.

The charging/discharging unit may be configured to discharge the secondary battery when the secondary battery is in a non-charging mode and the voltage and future temperature correspond to the second swelling condition.

The charging/discharging unit is configured to stop discharging the secondary battery by the charging/discharging unit when the voltage and the temperature correspond to the first swelling condition or a temperature increasing rate is less than zero.

The charging/discharging unit may be configured to adjust the current or the input voltage applied to the secondary battery when the secondary battery is in a charging mode and the voltage and the temperature correspond to the second swelling condition.

The charging/discharging unit may be configured to stop charging the secondary battery when the secondary battery is in the charging mode and the voltage and the temperature correspond to the second swelling condition.

The charging/discharging unit may be configured to discharge the secondary battery when a temperature increasing rate is greater than zero after the charging/discharging unit stops charging the secondary battery.

The charging/discharging unit may be configured to stop discharging the secondary battery when the temperature and the voltage of the secondary battery correspond to the first swelling condition or the temperature increasing rate is less than zero.

The temperature estimation unit may be configured to estimate the future temperature of the secondary battery when the measured voltage and the temperature correspond to the first swelling condition.

The measurement unit may be configured to measure the temperature and the voltage of the secondary battery more frequently when the measured voltage and the temperature correspond to the first or the second swelling condition than when the measured voltage and the temperature do not correspond to the first or the second swelling condition.

The measurement unit may be configured to measure the temperature and the voltage of the secondary battery more frequently when the secondary battery is in a charging mode than when the secondary battery is in a non-charging mode.

The temperature estimation unit may be configured to estimate the future temperature of the secondary battery based on at least one of a temperature increasing rate or a present temperature of the secondary battery.

The temperature increasing rate may be based on a difference between current and previous average temperatures.

The temperature estimation unit may be configured to estimate the future temperature of the secondary battery based on a multiple of a temperature increasing rate and/or a present temperature of the secondary battery, wherein the multiple varies according to the temperature increasing rate.

According to embodiments of the present invention, it is possible to prevent or substantially prevent, in advance, a swelling phenomenon from occurring in a secondary battery by previously estimating a risk that the swelling phenomenon may occur in the secondary battery and controlling charging/discharging of the secondary battery when the risk exists.

BRIEF DESCRIPTION OF THE DRAWINGS

The accompanying drawings, together with the specification, illustrate exemplary embodiments of the present inven

DETAILED DESCRIPTION

Figure 1:
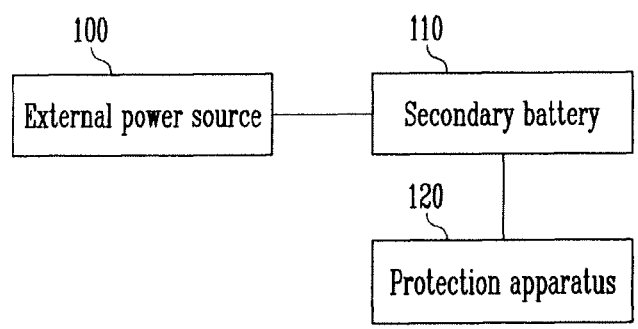
- FIG. 1 is a block diagram schematically showing a protection apparatus for a secondary battery according to an embodiment of the present invention.

Hereinafter, certain exemplary embodiments according to the present invention will be described with reference to the accompanying drawings. Here, when a first element is described as being coupled to a second element, the first element may be not only directly coupled to the second element but may also be indirectly coupled to the second element via a third element. Further, some of the elements that are not essential to the complete understanding of the invention are omitted for clarity. Also, like reference numerals refer to like elements throughout.

FIG. 1 is a block diagram schematically showing a protection apparatus for a secondary battery according to an embodiment of the present invention.

Referring to FIG. 1, the protection apparatus 120 is coupled to a secondary battery 110 so as to control charging/discharging of the secondary battery 110.

Here, an external power source 100 refers to a power source that charges the secondary battery 110 by applying current to the secondary battery 110. For example, the external power source 100 may be an AC adapter coupled to a charging device of the secondary battery 110 so as to apply current to the secondary battery 110, but the present invention is not limited thereto. That is, the external power source 100 may include all power sources that can apply current to the secondary battery 110.

The secondary battery 110 refers to a chemical battery that can repeatedly perform storage and radiation (e.g., charging and discharging) of energy by storing electrical energy as chemical energy and radiating chemical energy as electrical energy using the reversibility of an electrochemical reaction. The secondary battery 110 may include a lead-acid battery, a nickel cadmium (NiCd) battery, a nickel metal hydride (NiMH) battery, a lithium ion battery (LiB), a lithium polymer battery (LiPB), and the like.

The swelling phenomenon that occurs in the secondary battery 110 is an irreversible phenomenon. Therefore, to maintain stable performance of the secondary battery 110, it is important to prevent the swelling phenomenon from occurring in the secondary battery 110.

The protection apparatus 120 according to the present invention estimates a risk that the swelling phenomenon may occur in the secondary battery 110 by monitoring the temperature and voltage of the secondary battery 110, and controls the charging/discharging of the secondary battery 110, so that it is possible to prevent, in advance, the swelling phenomenon of the secondary battery 110.

According to an embodiment of the present invention, the protection apparatus 120 may be coupled to the secondary battery 110 so as to form a battery pack, or may be provided to an electronic device or charging device to which the secondary battery 110 is coupled so as to protect the secondary battery 110.

Hereinafter, the driving principle of the protection apparatus 120 will be described in detail with reference to FIG. 2.

Figure 2:
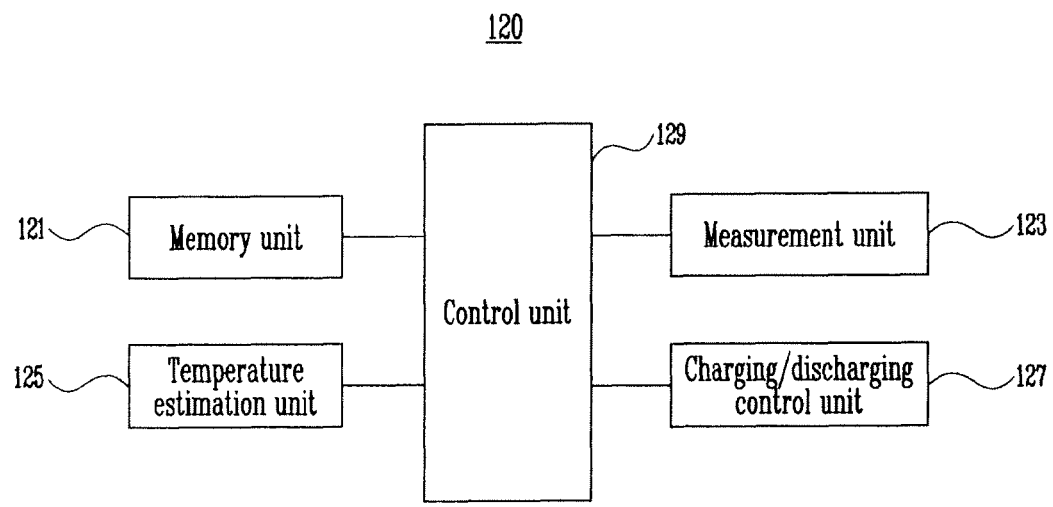
FIG. 2 is a block diagram showing a detailed configuration of the protection apparatus according to the embodiment of the present invention.

FIG. 2 is a block diagram showing a detailed configuration of the protection apparatus according to the embodiment of the present invention.

Referring to FIG. 2, the protection apparatus 120 may include a memory unit 121, a measurement unit 123, a temperature estimation unit 125, a charging/discharging control unit 127 and a control unit 129.

The memory unit 121 stores first and second swelling conditions of temperatures and voltages.

The first swelling condition corresponds to a swelling preliminary section having a high risk that the swelling phenomenon may occur, and the second swelling condition corresponds to a swelling section in which the swelling phenomenon may occur. For example, the first swelling condition is defined by a range of voltages corresponding to a range of temperatures for which a risk of the swelling phenomenon occurring is increased, and the second swelling condition is defined by a range of voltages corresponding to a range of temperatures for which a risk of the swelling phenomenon is even greater than that for the first swelling condition.

The first and second swelling conditions may be stored in the memory unit 121, for example, as shown in the following Tables 1 and 2.

TABLE 1

| | First swelling condition | | | | |
|---|---|---|---|---|---|
| | Temperature (T) | | | | |
| | $40 \leq T < 45$ | $45 \leq T < 50$ | $50 \leq T < 55$ | $55 \leq T < 60$ | $60 \leq T$ |
| Voltage (V) | $4.1 < V \leq 4.2$ | $4.0 < V \leq 4.1$ | $3.9 < V \leq 4.0$ | $3.8 < V \leq 53.9$ | $3.7 < V \leq 3.8$ |

TABLE 2

| | Second swelling condition | | | | |
|---|---|---|---|---|---|
| | Temperature (T) | | | | |
| | $40 \leq T < 45$ | $45 \leq T < 50$ | $50 \leq T < 55$ | $55 \leq T < 60$ | $60 \leq T$ |
| Voltage (V) | $4.2 < V$ | $4.1 < V$ | $4.0 < V$ | $3.9 < V$ | $3.8 < V$ |

The actual values satisfying or corresponding to the first swelling condition and second swelling condition may vary according to the design and function of the protection apparatus 120, but generally, as the temperature of the secondary battery 110 increases, the allowable voltage of the secondary battery 110 decreases. Therefore, as the temperature of the secondary battery 110 increases under the first and second swelling conditions, the allowable voltage of the secondary battery 110 decreases.

For example, as illustrated in Tables 1 and 2, in a case where the temperature of the secondary battery 110 is 47 degrees and the voltage of the secondary battery 110 is 4.05V, the first swelling condition is satisfied. In a case where the temperature of the secondary battery 110 is 47 degrees and the voltage of the secondary battery 110 is 4.2V, the second swelling condition is satisfied.

It will be apparent by those skilled in the art that the first and second swelling conditions are merely examples of embodiments of the present invention, and may be variously set by a user according to the kind of the secondary battery 110, the charging capacity of the secondary battery 110, the charging environment of the secondary battery 110, and the like. The first and second swelling conditions will be described in detail with reference to the accompanying drawings.

The measurement unit 123 measures temperatures and voltages of the secondary battery 110 during measurement periods (e.g., predetermined measurement periods). For example, in a case where the protection apparatus 120 operates in a non-charging mode, the measurement unit 123 may measure temperatures and voltages of the secondary battery 110 according to longer measurement periods than those in a case where the protection apparatus 120 operates in a charging mode.

According to an embodiment of the present invention, in a case where the measured temperatures and voltages of the secondary battery 110 satisfy or correspond to the first swelling condition, the measurement unit 123 may measure the temperatures and voltages of the secondary battery 110 by decreasing the measurement periods. Generally, the swelling phenomenon tends to rapidly occur in the secondary battery 110 according to the temperature and charging state of the secondary battery 110. Thus, in a case where the measured temperatures and voltages of the secondary battery 110 satisfy or correspond to the first swelling condition, the measurement unit 123 measures temperatures and voltages of the secondary battery 110 during shorter measurement periods, so that it is possible to rapidly prevent the swelling phenomenon from occurring in the secondary battery 110.

According to an embodiment of the present invention, the measurement unit 123 may compute a temperature average and a voltage average using temperatures and voltages measured during predetermined times and store the temperature and voltage averages in the memory unit 121.

For example, the measurement unit 123 may compute a temperature average of temperatures measured for 1 minute and a voltage average of voltages measured for 2 seconds, and store the temperature and voltage averages in the memory unit 121. In a case where the measurement period is 250 msec, the temperature average refers to an average of temperatures measured 240 times, and the voltage average refers to an average of voltages measured eight times. That is, the voltage and temperature averages computed in the measurement unit 123 may be renewed every two seconds and every one minute, respectively. Then, the renewed voltage and temperature averages may be stored in the memory unit 121. To perform temperature estimation, a predetermined number of past temperature averages may be stored together with the renewed temperature average in the memory unit 121.

The temperature and voltage averages are used in the temperature estimation and control of the charging/discharging of the secondary battery 110, so that exceptionally measured temperatures and voltages are removed, and accordingly, more exact temperature estimation can be performed.

Hereinafter, for convenience of illustration, it will be described that the temperature and voltage measured in the measurement unit 123 are a temperature average of temperatures, renewed every predetermined period, and a voltage average of voltages, renewed every predetermined period, respectively. However, the present invention is not limited thereto.

In a case where the temperatures and voltages measured in the measurement unit 123 satisfy or correspond to the first swelling condition, the temperature estimation unit 125 estimates a future temperature after a time period (e.g., a predetermined time period) using temperatures measured by the measurement unit 123.

More specifically, the temperature estimation unit 125 may estimate the future temperature after a time period (e.g., a predetermined time period) by using a temperature increasing rate computed using a temperature average before the predetermined time and a recently renewed temperature average. The temperature increasing rate and the estimated temperature after the predetermined time may be represented by the following Formula 1.

Temperature increasing rate=(Currently measured temperature average−Temperature average before predetermined time)

Estimated temperature=(Temperature increasing rate+ Present temperature)         Formula 1

For example, in a case where the temperature average measured during a time period ending 10 minutes prior to the present time is 42 degrees, the temperature average measured for recent one minute is 47 degrees, and the current (or present) temperature is 48 degrees, the estimated temperature after 10 minutes may be (47−42)+48=53 degrees.

According to an embodiment of the present invention, the temperature estimation unit 125 may estimate a temperature after a predetermined time using a weight according to the temperature increasing rate (e.g., a multiple of the temperature increasing rate, wherein the multiple can be a number less than 1). That is, because the swelling phenomenon may occur rapidly in the secondary battery 110, the probability that the swelling phenomenon will occur in the secondary battery 110 increases as the temperature increasing rate increases. Therefore, to reflect this fact, the estimated temperature may be increased by increasing the weight (or multiple) as the temperature increasing rate increases. In this case, the estimated temperature may be represented by the following Formula 2.

Estimated temperature=(Temperature increasing rate× Multiple)+Current temperature         Formula 2

For example, in a case where the value of the multiple is 1.1 when the temperature increasing rate is 1 degree, the value of the multiple is 1.5 when the temperature increasing rate is 4 degrees, and the present temperature is 40 degrees, the estimated temperatures become (1.1×1)+40=41 degrees and (4×1.5)+40=46 degrees, respectively. That is, as the temperature increasing rate increases, the temperature estimated in the temperature estimation unit 125 increases, and accordingly, the probability that the estimated temperature and the voltage average will satisfy or correspond to the second swelling condition increases.

In a case where the estimated temperature and the voltage average satisfy or correspond to the second swelling condition, the charging/discharging control unit 127 prevents or substantially prevents the swelling phenomenon from occurring in the secondary battery 110 by controlling the charging/discharging of the secondary battery 110.

Figure 3:
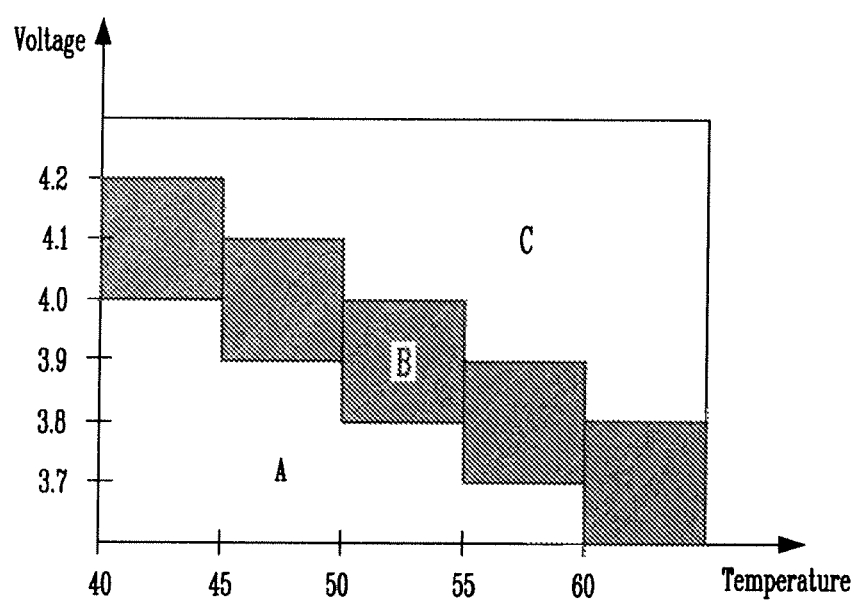
FIG. 3 is a graph illustrating a swelling condition and an operation of a charging/discharging control unit according to the swelling condition.

FIG. 3 is a graph illustrating a swelling condition and an operation of the charging/discharging control unit according to the swelling condition.

Referring to FIG. 3, regions A, B, and C correspond to a normal section, a swelling preliminary section and a swelling section, respectively. That is, the region A may be a safe or normal range of voltages and corresponding temperatures, whereas the region that satisfies or corresponds to the first swelling condition is shown as the region B, and the region that satisfies or corresponds to the second swelling condition is shown as the region C.

Therefore, in a case where the temperatures and voltages measured in the measurement unit 123 exist in the region B, the protection apparatus 120 may determine that there is a risk that the swelling phenomenon may occur in the secondary battery 110, and estimates a future temperature of the secondary battery 110 after a time period (e.g., a predetermined time period) using the temperature estimation unit 125. In a case where the estimated temperature and the voltage average renewed every predetermined time does not correspond to the region B and instead corresponds to the region C, the charging/discharging control unit 127 controls or adjusts the charging or discharging of the secondary battery 110 so as to prevent the swelling phenomenon from occurring in the secondary battery 110.

According to an embodiment of the present invention, in a case where the secondary battery 110 is in a non-charging mode, the charging/discharging control unit 127 may control or adjust the temperature and voltage of the secondary battery 110 to be maintain the first swelling condition by forcibly discharging the secondary battery 110 and thus decreasing the voltage of the secondary battery 110. After discharging the secondary battery 110, once the temperature and voltage of the secondary battery 110 exist in the region A (e.g., a normal or safe operating region), the charging/discharging control unit 127 may stop the discharging of the secondary battery 110.

According to an embodiment of the present invention, in a case where the secondary battery 110 is in a charging mode, the charging/discharging control unit 127 may control or adjust the temperature and voltage of the secondary battery 110 to maintain the first swelling condition by adjusting the current or voltage applied to the secondary battery 110. In a case where the temperature and voltage of the secondary battery 110 satisfy or correspond to the second swelling condition even though the current or voltage applied to the secondary battery 110 is adjusted, the charging/discharging control unit 127 may stop the charging of the secondary battery 110 by cutting off the current or voltage applied to the secondary battery 110.

In a case where the temperature increasing rate exceeds zero (i.e., the temperature of the secondary battery 110 is increasing) or the temperature and voltage satisfy or correspond to the first swelling condition, after the charging of the secondary battery 110 is stopped, the charging/discharging control unit 127 may forcibly discharge the secondary battery 110. Subsequently, in a case where the temperature and voltage of the secondary battery 110 satisfy or correspond to the first swelling condition or the temperature increasing rate is less than zero (i.e., the temperature of the secondary battery 110 is decreasing), after the discharging of the secondary battery 110, the charging/discharging control unit 127 may stop the discharging of the secondary battery 110.

According to an embodiment of the present invention, in a case where the temperatures and voltages measured in the measurement unit 123 have already satisfied the second swelling condition, the charging/discharging control unit 127 may immediately stop the charging of the secondary battery 110 and control the secondary battery 110 to be forcibly discharged.

The control unit 129 may generally control the memory unit 121, the measurement unit 123, the temperature estimation unit 125 and the charging/discharging control unit 127.

Figure 4:
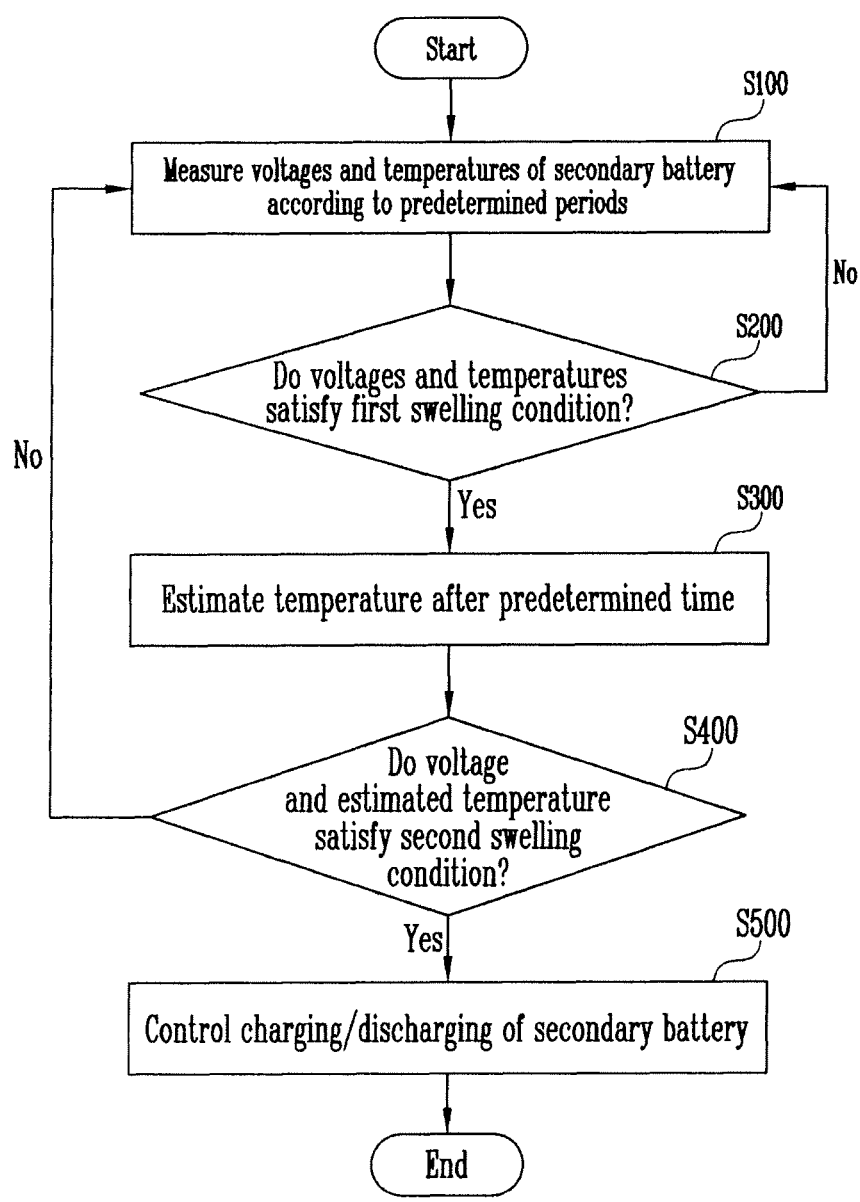
FIG. 4 is a flowchart illustrating a control method of the protection apparatus according to an embodiment of the present invention.

FIG. 4 is a flowchart illustrating a control method of the protection apparatus according to an embodiment of the present invention.

First, the measurement unit 123 measures voltages and temperatures of the secondary battery 110 according to or during time periods (e.g., predetermined time periods (S100).

The measurement unit 123 decides or determines whether or not the measured voltages and temperatures satisfy or correspond to a first swelling condition (S200). In a case where the measured voltages and temperatures satisfy or correspond to the first swelling condition, the temperature estimation unit 125 estimates a future temperature after a time period (e.g., a predetermined time period) using the temperatures measured in the measurement unit 123 (S300).

In a case where the measured voltages and temperatures satisfy or correspond to the first swelling condition, the measurement unit 123 may measure temperatures and voltages of the secondary battery 110 by decreasing the duration of the measurement periods. To perform exact temperature estimation, the measurement unit 123 may compute temperature and voltage averages that are averages of temperatures and voltage measured at different times or over different time periods.

The charging/discharging control unit 127 decides whether or not the estimated temperature and the voltage average satisfy or correspond to a second swelling condition (S400). In a case where the estimated temperature and the voltage average satisfy or correspond to the second swelling condition, the charging/discharging control unit 127 controls or adjusts charging/discharging of the secondary battery 110 (S500).

Figure 5:
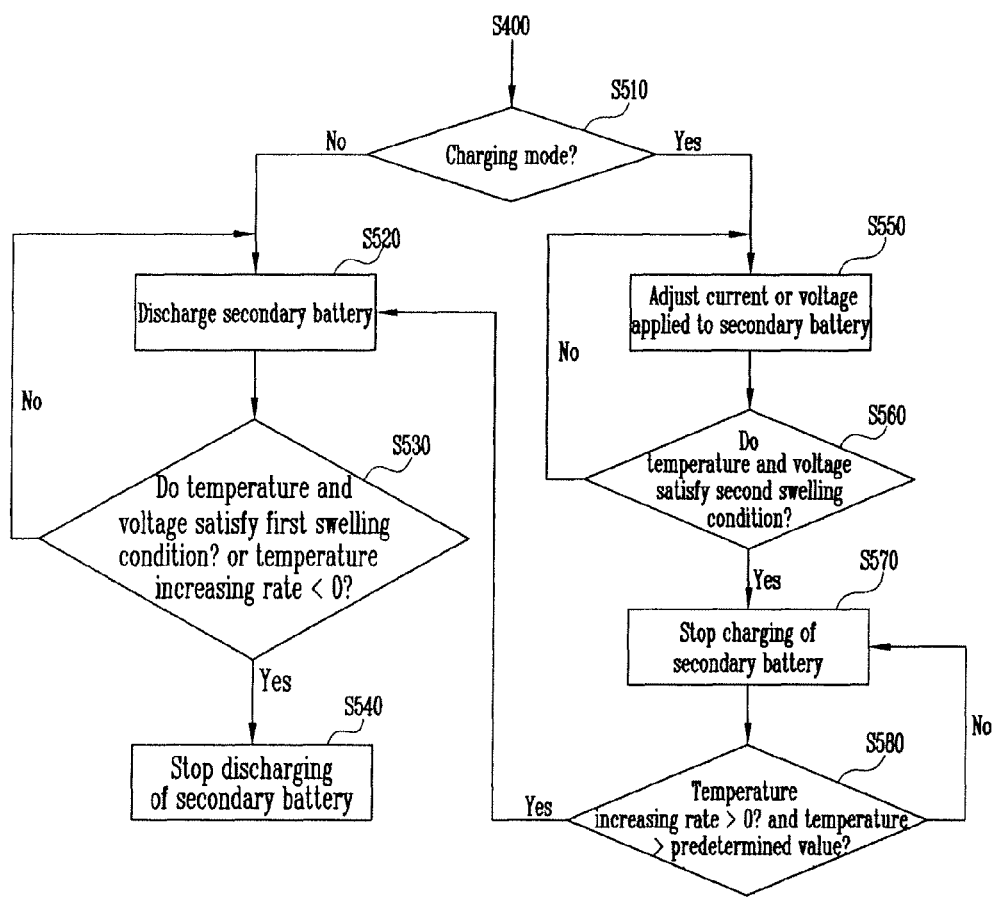
FIG. 5 is a flowchart illustrating an operation of the charging/discharging control unit according to an embodiment of the present invention.

FIG. 5 is a flowchart illustrating an operation of the charging/discharging control unit according to an embodiment of the present invention.

Referring to FIG. 5, the charging/discharging control unit 127 decides or determines whether the secondary battery 110 is in a charging mode or in a non-charging mode (S510).

In the case where the secondary battery 110 is in the non-charging mode, the charging/discharging control unit 127 forcibly discharges the secondary battery 110, so that it is possible to prevent (or substantially prevent), in advance, the swelling phenomenon from occurring in the secondary battery 110 (S520).

Subsequently, in the case where the temperatures and voltages of the secondary battery 110 satisfy or correspond to the first swelling condition, or the temperature increasing rate is less than zero (S530), the charging/discharging control unit 127 may stop the forcible discharging of the secondary battery 110 (S540). If the temperatures and voltages of the secondary battery do not correspond to the first swelling condition or the temperature increasing rate is not less than zero, the charging/discharging control unit 127 may continue to forcible discharge the secondary battery (S520).

In the case where the secondary battery 110 is in the charging mode (S510), the charging/discharging control unit 127 controls or adjusts the temperatures and voltages of the secondary battery 110 to maintain the first swelling condition by adjusting current and voltage applied to the secondary battery 110 (S550).

The charging/discharging control unit 127 decides whether or not the temperatures and voltages of the secondary battery 110 satisfy or correspond to the second swelling condition (S560). In the case where the temperatures and voltages of the secondary battery 110 satisfy or correspond to the second swelling condition even though the current or voltage applied to the secondary battery 110 is adjusted, the charging/discharging control unit 127 may stop the charging of the secondary battery 110 (S570).

In the case where the temperature increasing rate of the secondary battery 110 exceeds zero even though the charging of the secondary battery 110 is stopped (S580), the charging/discharging control unit 127 forcibly discharges the secondary battery 110, so that it is possible to prevent (or substantially prevent) the swelling phenomenon from occurring in the secondary battery 110. Forcible discharge continues until the temperature and voltage satisfy or correspond to the first swelling condition or the rate of temperature increase falls below zero (i.e., the temperature of the secondary battery 110 starts to decrease).

As described above, the protection apparatus 120 according to the present invention previously estimates a risk that the swelling phenomenon may occur in the secondary battery 110, and controls the charging/discharging of the secondary battery 110 when the risk exists, so that it is possible to prevent, in advance, the swelling phenomenon from occurring in the secondary battery 110.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and their equivalents.

What is claimed is:

1. A battery pack comprising:
   a secondary battery; and
   a protection device comprising:
   a measurement unit coupled to the secondary battery and configured to measure a temperature and a voltage of the secondary battery;
   a temperature estimation unit coupled to the measurement unit and configured to determine a temperature increasing rate of the secondary battery and estimate a future temperature of the secondary battery based on the temperature and the temperature increasing rate of the secondary battery;
   a memory unit coupled to the measurement unit and configured to store swelling condition data of the secondary battery, the swelling condition data comprising a first swelling condition and a second swelling condition; and
   a charging/discharging unit coupled to the secondary battery and configured to adjust a current or an input voltage applied to the secondary battery based on whether the future temperature and the voltage of the secondary battery correspond to the first swelling condition.

2. The battery pack of claim 1, wherein
   the first swelling condition comprises a first range of voltages corresponding to a range of temperatures, and
   the second swelling condition comprises a second range of voltages corresponding to the range of temperatures, wherein each temperature within the range of temperatures has a corresponding voltage within the second range of voltages.

3. The battery pack of claim 2, wherein the charging/discharging unit is configured to discharge the secondary battery when the secondary battery is in a non-charging mode and the voltage and future temperature correspond to the second swelling condition.

4. The battery pack of claim 3, wherein the charging/discharging unit is configured to stop discharging the secondary battery by the charging/discharging unit when the voltage and the temperature correspond to the first swelling condition or a temperature increasing rate is less than zero.

5. The battery pack of claim 2, wherein the charging/discharging unit is configured to adjust the current or the input voltage applied to the secondary battery when the secondary battery is in a charging mode and the voltage and the temperature correspond to the second swelling condition.

6. The battery pack of claim 5, wherein the charging/discharging unit is configured to stop charging the secondary battery when the secondary battery is in the charging mode and the voltage and the temperature correspond to the second swelling condition.

7. The battery pack of claim 6, wherein the charging/discharging unit is configured to discharge the secondary battery when a temperature increasing rate is greater than zero after the charging/discharging unit stops charging the secondary battery.

8. The battery pack of claim 7, wherein the charging/discharging unit is configured to stop discharging the secondary battery when the temperature and the voltage of the secondary battery correspond to the first swelling condition or the temperature increasing rate is less than zero.

9. The battery pack of claim 2, wherein the temperature estimation unit is configured to estimate the future temperature of the secondary battery when the measured voltage and the temperature correspond to the first swelling condition.

10. The battery pack of claim 2, wherein the measurement unit is configured to measure the temperature and the voltage of the secondary battery more frequently when the measured voltage and the temperature correspond to the first or the second swelling condition than when the measured voltage and the temperature do not correspond to the first or the second swelling condition.

11. The battery pack of claim 1, wherein the measurement unit is configured to measure the temperature and the voltage of the secondary battery more frequently when the secondary battery is in a charging mode than when the secondary battery is in a non-charging mode.

12. The battery pack of claim 1, wherein the temperature increasing rate is based on a difference between current and previous average temperatures.

13. The battery pack of claim 1, wherein the temperature estimation unit is configured to estimate the future temperature of the secondary battery based on a multiple of a temperature increasing rate and/or the temperature of the secondary battery, wherein the multiple varies according to the temperature increasing rate.

* * * * *